(12) United States Patent
Lakkis

(10) Patent No.: US 7,339,955 B2
(45) Date of Patent: Mar. 4, 2008

(54) TDMA COMMUNICATION METHOD AND APPARATUS USING CYCLIC SPREADING CODES

(75) Inventor: Ismail Lakkis, San Diego, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 450 days.

(21) Appl. No.: 10/961,592

(22) Filed: Oct. 8, 2004

(65) Prior Publication Data

US 2005/0068932 A1   Mar. 31, 2005

Related U.S. Application Data

(63) Continuation-in-part of application No. 09/670,054, filed on Sep. 25, 2000, now Pat. No. 7,031,371.

(51) Int. Cl.
*H04J 3/00* (2006.01)

(52) U.S. Cl. .................. 370/498; 370/480; 370/336; 370/337; 455/403; 455/17; 455/447; 455/39

(58) Field of Classification Search ................ 370/347, 370/324, 350, 336, 337, 335, 515, 513, 512, 370/509, 510, 532, 533, 534, 535–542, 312, 370/310, 482, 480, 479, 464, 498, 209, 320, 370/342; 375/1, 114, 297, 312, 260, 147, 375/148, 347, 200, 206, 208, 367, 340, 134, 375/137, 140, 145, 365, 366, 368, 238; 455/126, 455/127.1, 403, 424, 425, 456.5, 456.6, 550.1, 455/575.1, 67.11, 63.1, 561, 454, 61, 422.1, 455/450, 447, 17, 59, 41.2
See application file for complete search history.

(56) References Cited

U.S. PATENT DOCUMENTS

| | | | | |
|---|---|---|---|---|
| 5,177,767 A | * | 1/1993 | Kato | 375/142 |
| 5,377,223 A | * | 12/1994 | Schilling | 375/146 |
| 5,416,767 A | * | 5/1995 | Koppelaar et al. | 370/210 |
| 5,467,367 A | * | 11/1995 | Izumi et al. | 375/142 |
| 5,563,909 A | | 10/1996 | Nakazawa | |
| 5,675,572 A | | 10/1997 | Hidejima et al. | |
| 5,677,927 A | * | 10/1997 | Fullerton et al. | 375/130 |
| 5,852,770 A | * | 12/1998 | Kasamatsu | 455/126 |
| 5,943,331 A | * | 8/1999 | Lavean | 370/335 |
| 5,949,813 A | | 9/1999 | Hunsinger et al. | |
| 5,978,412 A | * | 11/1999 | Takai | 375/145 |
| 6,049,707 A | | 4/2000 | Buer et al. | |

(Continued)

OTHER PUBLICATIONS

John A C. Bingham, Multicarrier Modulation for Data Transmission: An Idea Whose Time Has Come, IEEE Communications Magazine, May 1990, pp. 5-14.

(Continued)

*Primary Examiner*—Edward F. Urban
*Assistant Examiner*—Charles Chow

(57) ABSTRACT

Systems and methods of ultra-wideband communication are provided. In one embodiment, an ultra-wideband communication system divides a stream of data conveying symbols into a plurality of unspread substreams. A common spreading code is generated at the ultra-wideband transmitter, and each of the unspread substreams are spread using the common spreading code to form a plurality of spread substreams. The spread substreams are combined to form a composite signal that is transmitted. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

3 Claims, 9 Drawing Sheets

U.S. PATENT DOCUMENTS

| | | | |
|---|---|---|---|
| 6,078,576 A * | 6/2000 | Schilling et al. | 370/347 |
| 6,108,317 A * | 8/2000 | Jones et al. | 370/320 |
| 6,133,876 A * | 10/2000 | Fullerton et al. | 342/375 |
| 6,192,068 B1 | 2/2001 | Fattouche et al. | |
| 6,300,903 B1 * | 10/2001 | Richards et al. | 342/450 |
| 6,320,897 B1 | 11/2001 | Fattouche et al. | |
| 6,356,607 B1 * | 3/2002 | Scott et al. | 375/354 |
| 6,392,500 B1 * | 5/2002 | McCallister et al. | 332/103 |
| RE37,802 E | 7/2002 | Fattouche et al. | |
| 6,549,567 B1 * | 4/2003 | Fullerton | 375/219 |
| 6,690,741 B1 * | 2/2004 | Larrick et al. | 375/295 |
| 6,952,456 B1 * | 10/2005 | Aiello et al. | 375/295 |
| 7,076,168 B1 * | 7/2006 | Shattil | 398/76 |
| 7,088,795 B1 * | 8/2006 | Aiello et al. | 375/356 |
| 7,206,349 B2 * | 4/2007 | Linnartz et al. | 375/260 |
| 2002/0159425 A1 * | 10/2002 | Uesugi et al. | 370/342 |
| 2003/0091100 A1 * | 5/2003 | El Nahas El Homsi et al. | 375/143 |
| 2003/0161411 A1 * | 8/2003 | McCorkle et al. | 375/295 |
| 2006/0039317 A1 * | 2/2006 | Subramanian et al. | 370/328 |
| 2006/0291537 A1 * | 12/2006 | Fullerton et al. | 375/145 |

OTHER PUBLICATIONS

Cheong Yui Wong, Roger S. Cheng, Khaled Ben Letaief and Ross D. Murch, Multiuser OFDM with Adaptive Subcarrier, Bit, and Power Allocation, IEEE Journal on Selected Areas in Communications, vol. 17, No. 10, Oct. 1999, pp. 1747-1758.

Rick S. Blum, Ye Li, Jack H. Winters and Qing Yan, Improved Space—Time Coding for MIMO-OFDM Wireless Communications, IEEE Transactions on Communications, vol. 49, No. 11, Nov. 2001, pp. 1873-1878.

Ove Edfords, Magnus Sandell, Jan-Jaap Van De Beek, Daniel Lamdstrom and Frank Sjoberg, An Introduction to orthogonal frequency-division multiplexing, Sep. 1996, 50 pages.

Justin Chuang and Nelson Sollenberger, Beyond 3G: Wideband Wireless Data Access Based on OFDM and Dynamic Packet Assignment, Multiple Access for Broadband Wireless Networks, IEEE Communications Magazine, Jul. 2000, pp. 78-87.

Patrick Vandenameele, Liesbet Van Der Perre, Marc Engels, Bert Gyselinckx and Hugo De Man, A Combined OFDM/SDMA Approach, IEEE Journal on Selected Areas in Communications, Nov. 2000, 27 pages.

Zhong Ye, Gary J. Saulnier, Kenneth S. Vastola and Michael J. Medley, Throuput Analysis for a Packet Radio Network Using Rate Adaptive OFDM Signaling, IEEE International Conference on Communications, Jun. 1999, 7 pages.

Bruno Pattan, A Brief Exposure to Ultra-Wideband Signaling, Microwace Journal, Dec. 2003, 5 pages.

David G. Leeper, Wireless Data Blaster, Scientific American, May 2002, pp. 64-69.

Joy Kelly et al., Multi-band OFDM Physical Layer Proposal Update, IEEE P802.15 Working Group for Wireless Personal Area Networks, IEEE 802.15-4/0122r4, Mar. 15, 2004, 26 pages.

Jeff Foerster et al., Intel CFP Presentation for a UWB PHY, IEEE P802.15 Working Group for Wireless Personal Area Networks, IEEE 802.15-03/109, Mar. 3, 2003, 53 pages.

Jussi Aijanen, Otto Lehtinen, Janne Kurjenniemi & Tapani Ristaniemi, Frame Configuration Impact to the Performance of UTRA TDD System, 5 pages.

Giovanni Cherubini, Hybrid TDMA/CDMA Based on Filtered Multitone Modulation for Uplink Transmission in HFC Networks, IEEE Communications Magazine, Oct. 2003, pp. 108-115.

Harald Haas & Stephen McLaughlin, A Dynamic Channel Assignment Algorithm for a Hybrid TDMA/CDMA-TDD Interface Using the Novel TS-Opposing Technique, IEEE Journal On Selected Areas in Communication, vol. 19, No. 10, Oct. 2001, pp. 1831-1846.

K. W. Richardson, UMTS Overview, Electronics & Communication Engineering Journal, Jun. 2000, pp. 93-101.

Prodip Chaudhury, Werner Mohr & Seizo Onoe, The 3GPP Proposal for IMT-2000, IEEE Communications Magazine, Dec. 1999, pp. 72-81.

Paul Walter Baier, Peter Jung & Anja Klain, Taking the Challenge of Multiple Access for Third-Generation Cellular Mobile Radio Systems—A European View, IEEE Communications Magazine, Feb. 1996, pp. 82-89.

* cited by examiner

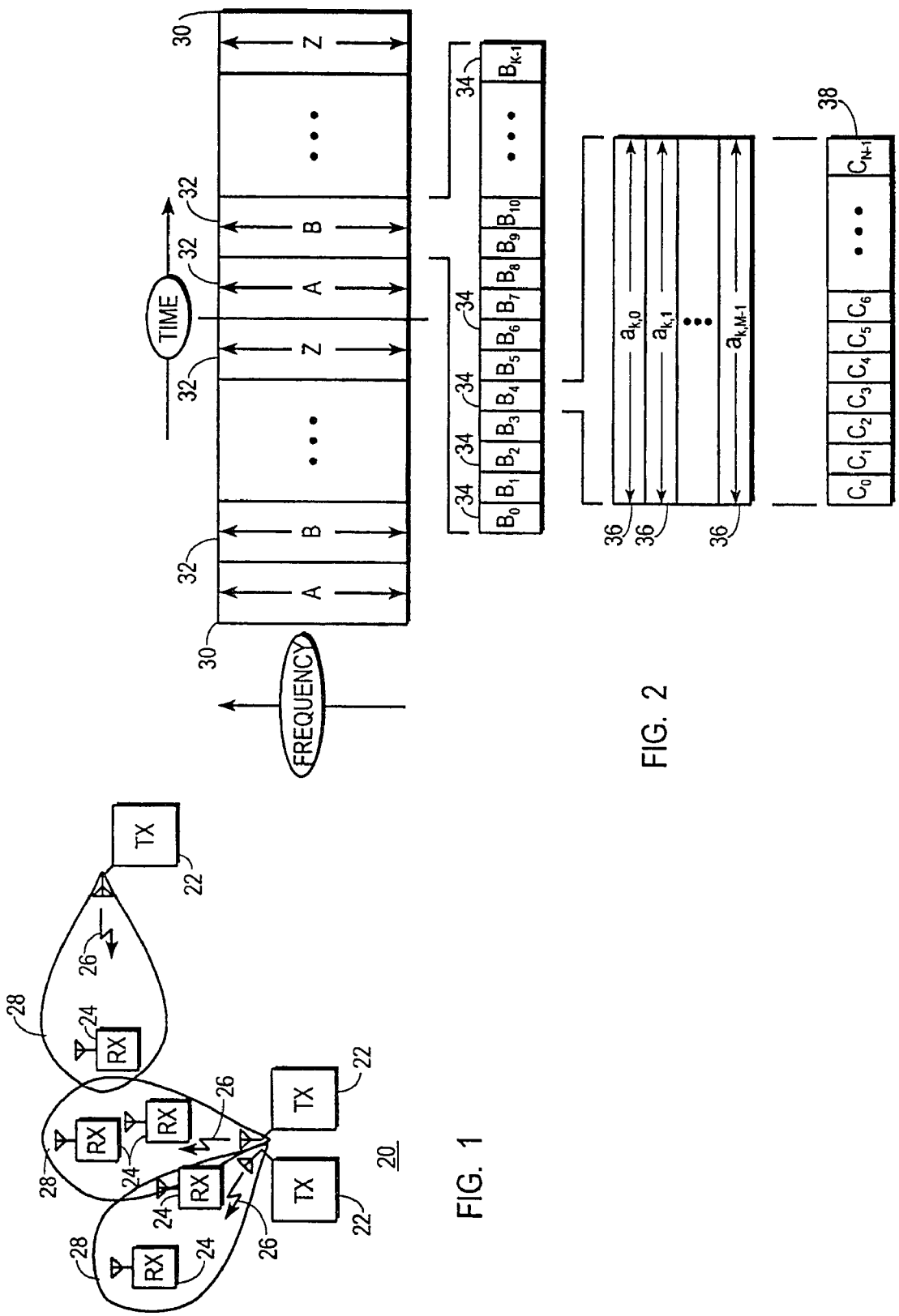

TDMA COMMUNICATION METHOD AND APPARATUS USING CYCLIC SPREADING CODES

This application is a continuation-in-part of U.S. application Ser. No. 09/670,054 filed Sep. 25, 2000 now U.S. Pat. No. 7,031,371 entitled "METHOD AND APPARATUS FOR WIRELESS COMMUNICATIONS."

TECHNICAL FIELD OF THE INVENTION

The invention relates generally to ultra-wideband communications, and more particularly to systems and methods for communication using ultra-wideband technology.

BACKGROUND OF THE INVENTION

The electromagnetic spectrum used to convey radio communications is a precious commodity. Communication systems seek to use this spectrum as efficiently as possible to maximize the capacity or quantity of information, which can be conveyed using the spectrum.

Various multiple access techniques have been developed to transfer information among a number of users, all while efficiently using spectrum. Time division multiple access (TDMA) techniques assign different users to different time slots. Capacity is hard limited by the number of time slots available. To prevent intolerable interference, the portion of the spectrum used in one radio coverage area or cell has conventionally been unusable in adjacent cells. Thus, only a fraction, typically less than one-third, of the entire spectrum available for conveying communications has been conventionally usable in any one location. In other words, conventional TDMA systems employ a frequency reuse pattern of at least three, indicating an inefficient use of spectrum.

Conventional direct sequence spread spectrum (DSSS) code division multiple access (CDMA) techniques theoretically use the spectrum more efficiently than TDMA techniques. However, in practice conventional DSSS-CDMA techniques typically fail to provide results significantly better than TDMA. DSSS-CDMA techniques assign different users to different codes. The different codes have conventionally been selected because of orthogonality or low cross correlation properties with the codes of other users. These properties minimize interference. All communications are broadcast using the same spectrum, so the frequency reuse pattern equals one. While the commonly used spectrum conveys a composite of communications for all users, each individual user's communications are extracted from the composite by correlating a received signal against the individual user's assigned code.

Capacity in conventional DSSS-CDMA systems is interference limited. In other words, more and more codes can be assigned so that the given amount of spectrum can service more and more users until interference reaches a level where only a minimally acceptable quality of service results. In practice, most conventional DSSS-CDMA systems can assign far fewer codes than appear theoretically possible due to a near-far effect and multipath. The near-far effect results when signals from different users are received with greatly differing field strengths, but this detrimental effect may be ameliorated somewhat by power control.

Multipath results when the transmitted signal takes multiple paths to the receiver due to being reflected from and deflected around obstacles in the environment. As the signal propagates over the multiple paths, different propagation delays are experienced. Thus, a signal transmitted at a precise instant in time is received spread over an interval, causing the signal to interfere with itself. In conventional DSSS-CDMA communication systems, multipath tends to destroy the orthogonality of spreading codes, resulting in dramatically increased interference.

SUMMARY OF THE INVENTION

In order to combat the above problems, systems and methods described herein provide a novel ultra-wideband communication system. In one embodiment, an ultra-wideband communication system divides a stream of data conveying symbols into a plurality of unspread substreams. A common spreading code is generated at the ultra-wideband transmitter, and each of the unspread substreams are spread using the common spreading code to form a plurality of spread substreams. The spread substreams are combined to form a composite signal that is transmitted.

In another embodiment, an ultra-wideband communication system comprises a demultiplexer for dividing a stream of data conveying symbols into a plurality of unspread substreams. A spreading section is coupled to the demultiplexer and configured to generate a plurality of spread substreams from the plurality of unspread substreams. A combining section is coupled to the spreading section and configured to form a composite signal from the plurality of spread substreams, and a transmission section is coupled to the combining section and configured to transmit the composite signal over an ultra-wideband communication channel.

These and other features and advantages of the present invention will be appreciated from review of the following Detailed Description of the Preferred Embodiments, along with the accompanying figures in which like reference numerals are used to describe the same, similar or corresponding parts in the several views of the drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a layout diagram of an exemplary environment in which the present invention may be practiced;

FIG. 2 shows a timing diagram, which depicts a temporal format of a TDMA communication signal;

Figure 3:
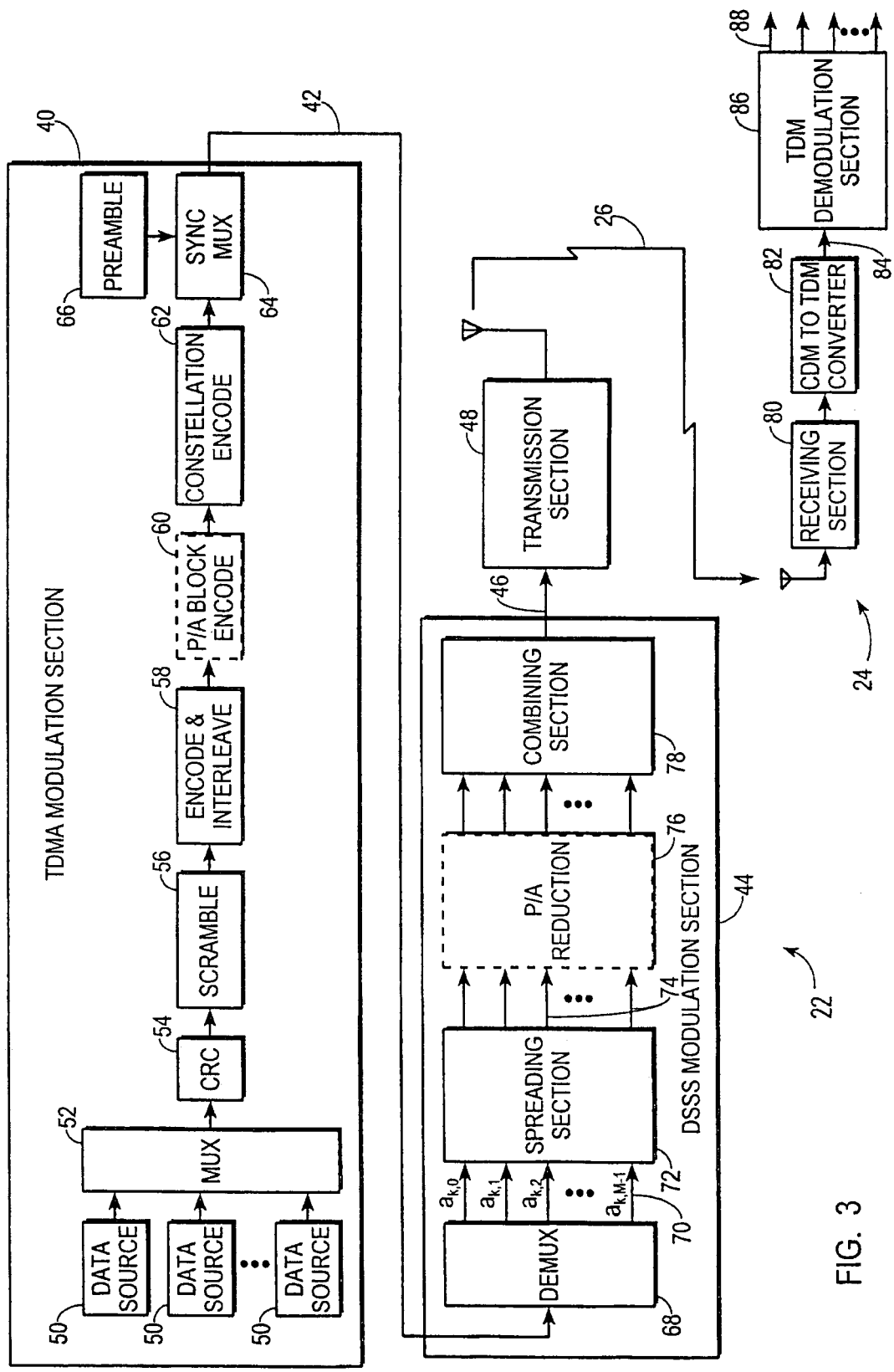
FIG. 3 shows a block diagram of a transmitter and a receiver configured in accordance with the teaching of the present invention.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides several advantages and features, for example, the present invention combines TDMA and spread spectrum techniques so that wireless communications capacity is increased over the capacities achievable through conventional TDMA and/or CDMA systems using an equivalent amount of spectrum.

Another advantage of the present invention is that robust, simple, and inexpensive processing techniques are usable, making the present invention suitable for hubs, subscriber units, mobile stations/fixed stations, portable stations, and the like.

Another advantage is that the present invention may be adapted to and used in conjunction with a variety of modulation and multiple access techniques, such as frequency division multiple access (FDMA) and orthogonal frequency division multiplexing (OFDM).

Another advantage of the present invention is that a composite RF communication signal includes signal components obtained by modulating diverse branches of a single user's data stream using cyclic variants of a common spreading code.

Another advantage is that the present invention is configured to tolerate self-interference and is better able to tolerate multipath than conventional DSSS-CDMA communication systems.

These and other features and advantages of the present invention will be appreciated from review of the following discussion:

FIG. 1 shows a layout diagram of an exemplary environment in which a communication system 20 configured in accordance with the teaching of the present invention may be practiced. Communication system 20 includes any number of transmitters (TX's) 22 (three shown) and any number of receivers (RX's) 24 (five shown). Transmitters 22 wirelessly broadcast messages through RF time domain multiple access (TDMA) communication signals 26 which are receivable by receivers 24 located within radio coverage areas 28 for the transmitters 22. Radio coverage areas 28 may also be called cells or sectors. As illustrated in FIG. 1, various ones of radio coverage areas 28 may be adjacent to one another and even overlap to some extent. In the preferred embodiment, a common spectrum is used in all radio coverage areas 28 so that communication system 20 has a frequency reuse pattern substantially equal to one.

For the sake of clarity, FIG. 1 depicts only a forward link in which radio equipment is viewed as being only a transmitter 22 or a receiver 24. However, those skilled in the art will appreciate that a reverse link may also be implemented and that each item of equipment may have both a transmitter and receiver. The reverse link may use the same or a different spectrum from the forward link. If a forward link conforms to the teaching of the present invention, then the reverse link may or may not conform, and vice versa.

FIG. 2 shows a timing diagram, which depicts an exemplary temporal format for TDMA communication signal 26. FIG. 2 specifically depicts two frames 30, each of which is temporally subdivided into any number of timeslots 32. Different timeslots 32 are preferably assigned to different receivers 24 (FIG. 1) in a manner well understood in the art so that different recipients are distinguished from one another by being assigned to the different time slots 32. In the preferred embodiments, TDMA communication signal 26 consumes the entire common spectrum for each time slot 32. Nothing requires a time slot 32 to be assigned to receivers 24 for an indefinite period or to be of the same duration as other time slots 32.

Each time slot 32 of TDMA communication signal 26 is subdivided into successive blocks 34 of symbols 36. FIG. 2 labels blocks 34 with the identifiers $B_k$, for k=0 to K−1, where K is an integer number. Any number of blocks 34 may be included in each timeslot 32. Each block $B_k$ includes M symbols 36, labeled as $a_{k,m}$ for m=0 to M−1, where M is an integer number. FIG. 2 illustrates each of symbols 36 within a block 34 as being concurrently present throughout the entire duration of a block period because certain preferred embodiments discussed below configure symbols 36 to remain present for block periods.

FIG. 2 further illustrates that the M symbols 36 of each block 34 are spread using an N-chip spreading code 38, labeled as $C_n$, for n=0 to N−1, where N is an integer number. As discussed in more detail below, each symbol 36 is independently spread using cyclic variations of the same common code 38. The number M of symbols 36 in a block may equal the number N of chips in a spreading code, in which case the spreading factor equals one. However, performance improvements result when N is greater than M.

FIG. 3 shows a block diagram of a single transmitter 22 and a single receiver 24 configured in accordance with the teaching of the present invention. Those skilled in the art will appreciate that all transmitters 22 and receivers 24 may be configured similarly. In addition, any number of receivers 24 may, at any given instant, receive TDMA communication signal 26 from a given transmitter 22 and, in fact, may receive TDMA communication signals 26 from more than one transmitter 22.

Transmitter 22 includes a TDMA modulation section 40, which generates a TDMA-configured stream 42 of data conveying symbols 36. Stream 42 feeds a direct sequence spread spectrum (DSSS) modulation section 44, which generates a composite signal 46. Composite signal 46 feeds a transmission section 48, which forms TDMA communication signal 26 from composite signal 46 and wirelessly broadcasts TDMA communication signal 2 6 for reception by receivers 24 located within radio coverage area 28 (FIG. 1) of transmitter 22

Within TDMA modulation section 40 any number of data sources 50 supply digital data to a multiplexer (MUX) 52. The digital data from data sources 50 may be intended for any number of receivers 24. Multiplexer 52 groups the digital data so that data intended for different receivers 24 are serially fed to a cyclic redundancy check (CRC) section 54 in accordance with the assignment of timeslots 32 (FIG. 2) to receivers 24. CRC section 54 provides forward error correction in a manner well understood by those skilled in the art.

From CRC section 54, the input data stream may be fed through a scrambler 56 which randomizes the data to an encode and interleave section 58. Section 58 may apply another type of error correction, such as convolutional or turbo encoding, to the input stream, and interleave the data. CRC section 54 and section 58 may utilize a form of block encoding. The block size or boundaries of such encoding need have no relationship to blocks 34 (FIG. 1), discussed above.

However, the output of section 58 feeds an optional peak-to-average (P/A) block encoding section 60. P/A block encoding section 60 applies a type of encoding which primarily reduces the peak-to-average power ratio in composite signal 46 and thereby lessens the demands placed on a power amplifier included in transmission section 48 to faithfully reproduce communication signal 26 with a minimum amount of distortion. This type of encoding may, but is not required to, provide additional coding gain. In the preferred embodiments, when P/A block encoding section 60 is included, it applies block encoding so that encoded blocks coincide with successive blocks of symbols 36 (FIG. 2), discussed above. In other words, the data are encoded so that P/A encoded blocks begin with symbol 36 $a_{k,0}$ (FIG. 2) and end with symbol 36 $a_{k,m}$ (FIG. 2).

P/A block encoding section 60 feeds a constellation encoding section 62 which converts the data into complex symbols in accordance with a predetermined phase constellation. As an example, each four-bit group of data output from P/A block encoding section 60 may be mapped by section 62 into a single complex symbol having in-phase and quadrature components in accordance with a 16-QAM phase constellation. However, those skilled in the art will appreciate that the present invention may be used with any type or size of phase constellation.

The stream of complex symbols output from constellation encode section 62 passes through a synchronization multiplexer (SYNC MUX) 64, where a preamble 66 is inserted into the stream at appropriate intervals. Preamble 66 is a known code which helps receivers 24 obtain synchronization and determine the timing of frames 30 and time slots 32 (FIG. 2). The resulting TDMA-configured complex stream 42 serves as the output from TDMA modulation section 40 and feeds DSSS modulation section 44.

Within DSSS modulation section 44, a demultiplexer (DEMUX) 68 divides TDMA-configured stream 42 of complex symbols 36 into blocks 34 (FIG. 2) of symbols 36. As a result, M unspread complex symbol substreams 70 are provided by demultiplexer 68 so that each unspread substream 70 contributes a single complex symbol 36 during each block 34, and each block 34 has a block period T*M, where T is the symbol period of TDMA-configured stream 42.

Unspread substreams 70 feed a spreading section 72. Within spreading section 72, cyclic variations of common spreading code 38 (FIG. 2) are applied to the M unspread substreams 70 to form M spread substreams 74 of "chips." The chip period in each spread substream 74 is T*M/N. The M spread substreams 74 may be passed through an optional peak-to-average (P/A) reduction section 76 which adjusts phase angles of the complex chips conveyed in the spread substreams 74 in a manner understood by those skilled in the art to reduce peak-to-average power ratio and lessen demands placed on a power amplifier. Following P/A reduction section 76, a combining section 78 combines spread substreams 74 to form composite signal 46. Various embodiments of DSSS modulation section 44 are discussed in more detail below.

Transmission section 48 includes any number of components and functions well known to those skilled in the art. For example, scrambling section 56 and/or synchronization multiplexer 64, discussed above, may be included in transmission section 48 rather than in TDMA modulation section 40. A pulse shaping section (not shown) is desirably included in transmission section 48 to spread the energy from each chip over a number of chip intervals using a suitable filter which minimizes inter-symbol or inter-chip interference so that spectral constraints may be observed. Transmission section 48 may also include digital-to-analog conversion, quadrature modulation, up-conversion, and power amplification functions, all implemented in conventional fashion. Power control may be implemented in transmission section 48 at the power amplifier to ameliorate a potential near-far problem, which should be much less pronounced in communication system 20 (FIG. 1) than in traditional CDMA communication systems. After pulse shaping, analog conversion, up-conversion, and amplification, TDMA communication signal 26 is formed from composite signal 46 and wirelessly broadcast from transmission section 48. Receiver 24 receives TDMA communication signal 26.

Within receiver 24, communication signal 26 is processed through a receiving section 80 and passed to a code division multiplex (CDM) to time division multiplex (TDM) converter 82. CDM to TDM converter 82 produces a baseband signal 84, which is further demodulated in a TDM demodulation section 86, with individual users receiving their respective data streams 88. Of course, nothing requires a receiver 24 to serve multiple users and TDM demodulation section 86 may simply provide a data stream intended for a single user.

Receiving section 80 includes any number of components and functions well known to those skilled in the art. For example, amplifying, filtering, and down-conversion may be performed to form an intermediate frequency (IF) signal. The IF signal may be converted from an analog form into a digital form, and automatic gain control (AGC) may be provided. In the preferred embodiments, the digitized form of the down-converted communication signal 26 passes to CDM to TDM converter 82.

Generally, CDM to TDM converter 82 performs despreading and optionally performs equalization on the communication signal. Various embodiments of CDM to TDM converter 82 are discussed in more detail below.

TDM demodulation section 86 includes any number of components and functions well known to those skilled in the art. For example, channel estimation and synchronization may be performed in TDM demodulation section 82. A rake receiver and/or equalizer may be included. De-interleaving, error correction decoding, and descrambling are desirably performed, and preambles and other control data are evaluated to detect time slots assigned to the receiver 24. These and other components and functions conventionally used in digital demodulators may be included in TDM demodulation section 86.

Figure 4:
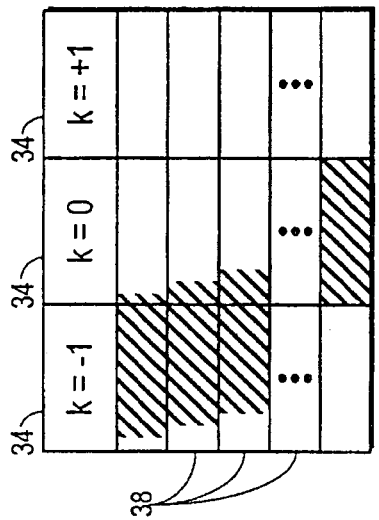
FIG. 4 shows a timing diagram depicting how a cyclic spreading code is applied to blocks of unspread data streams in accordance with first, second and third embodiments of a DSSS modulation section in the transmitter of the present invention.

FIG. 4 shows a timing diagram depicting how common spreading code 38 (FIG. 2) is applied to blocks 34 (FIG. 2) of unspread data substreams 70 (FIG. 3) in accordance with first, second and third embodiments of DSSS modulation section 44 (FIG. 3) in transmitter 22 (FIG. 3). FIG. 4 is presented in tabular form, with rows representing the application of the chips of common spreading code 38 to symbols 36 (FIG. 2). Columns in FIG. 4 depict successive blocks 34. As indicated by a shaded region in FIG. 4, spreading code 38 is applied to unspread substreams 70 so that composite signal 46 is influenced, at least for a portion of the time, by symbols 36 from two different blocks 34. In particular, in the specific embodiment depicted by FIG. 4, for only a single chip of each block period is composite signal 46 influenced by symbols 36 from a common block 34 of symbols. The manner of application of common spreading code 38 (FIG. 2) to blocks 34 (FIG. 2) of unspread data substreams 70 depicted in FIG. 4 may be contrasted with an alternate embodiment, discussed below in connection with FIG. 11.

Figure 5:
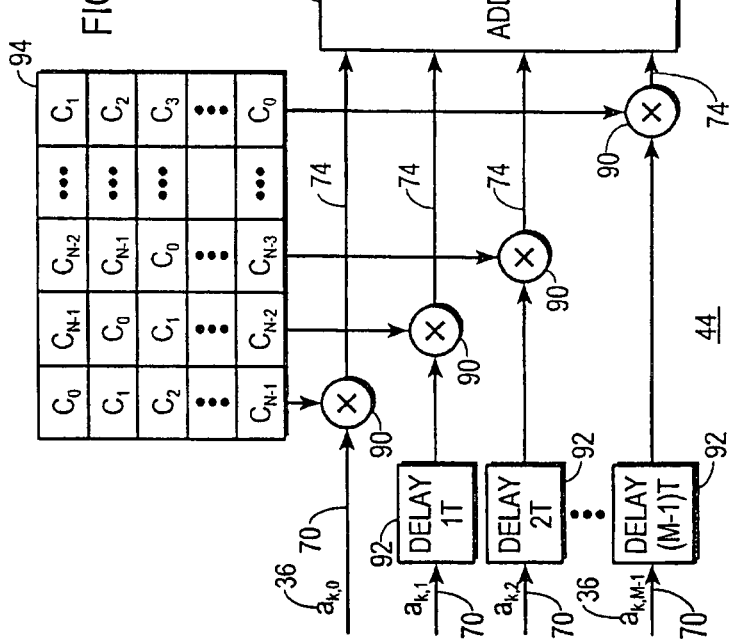
FIG. 5 shows a block diagram of the first embodiment of the DSSS modulation section.

FIG. 5 shows a block diagram of the first embodiment of DSSS modulation section 44. Demultiplexer 68 is omitted from FIG. 5 for convenience. The unspread substream 70 conveying symbols $a_{k,0}$ experiences no delay before being fed to a first input of a multiplier 90. However, the unspread substreams 70 conveying symbols $a_{k,1}$ through $a_{k,M-1}$ are respectively delayed in delay elements 92 by 1 through M−1 symbol periods (T) before being fed to respective first inputs of other multipliers 90.

A spreading code generation section 94 generates cyclic variations of common spreading code 38. FIG. 5 illustrates code generation section 94 in matrix form, which matrix takes on a cyclic Toeplitz form because the matrix elements hold cyclic variations of the same spreading code 38. As depicted in FIG. 5, different columns of the matrix supply code chips $C_o$ through $C_{N-1}$ to second inputs of respective multipliers 90. Different rows of the matrix indicate different code chips to apply during different chip intervals. So long as the number (N) of chips in spreading code 38 is greater than or equal to the number (M) of symbols 36 per block 34, different code chips of the same code are applied to different symbols during any and all chip intervals.

Outputs of multipliers 90 provide respective spread substreams 74. FIG. 5 omits depiction of optional P/A reduction section 76 (FIG. 3) for convenience. Combining section 78 takes the form of an adder, so that composite signal 46 during each chip interval equals the sum of M symbols 36, with each of the M symbols being premultiplied by designated chips of common spreading code 38. Accordingly, DSSS modulating section 44 temporally offsets application of common spreading code 38 to unspread substreams 70 so that the resulting spread substreams 74 correspond to unspread substreams 70 modulated by cyclic variations of common spreading code 38.

Figure 6:
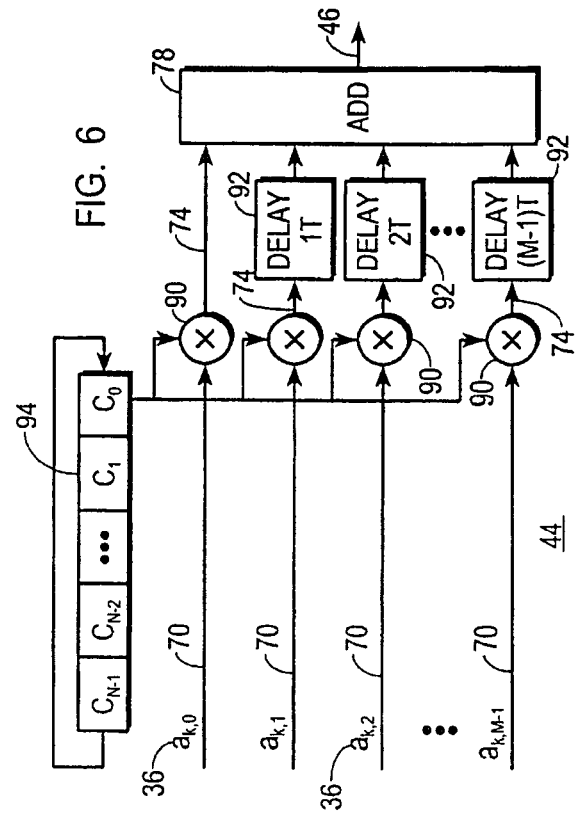
FIG. 6 shows a block diagram of the second embodiment of the DSSS modulation section.

FIG. 6 shows a block diagram of the second embodiment of DSSS modulation section 44. This second embodiment is equivalent to the first embodiment of FIG. 5, but it is implemented differently. Demultiplexer 68 (FIG. 3) is omitted from FIG. 6 for convenience. In this embodiment, spreading code generation section 94 need not be implemented as a two-dimensional matrix having a different row to define the different chips to be applied during different chip intervals, as discussed above in connection with FIG. 5. Rather, spreading code generation section 94 may be implemented as a one-dimensional matrix having different columns, and only one of those columns is simultaneously applied to different unspread substreams 70. Spreading code generation section 94 may be implemented as a shift register configured to shift cyclically at the chip rate. In order to achieve the appropriate temporal offsetting, delay elements 92 are now positioned between multipliers 90 and the adder of combining section 78. Accordingly, in this second embodiment of DSSS modulating section 44, DSSS modulating section 44 temporally offsets the application of common spreading code 38 to unspread substreams 70 so that the resulting spread substreams 74 correspond to unspread substreams 70 modulated by cyclic variations of common spreading code 38.

Figure 7:
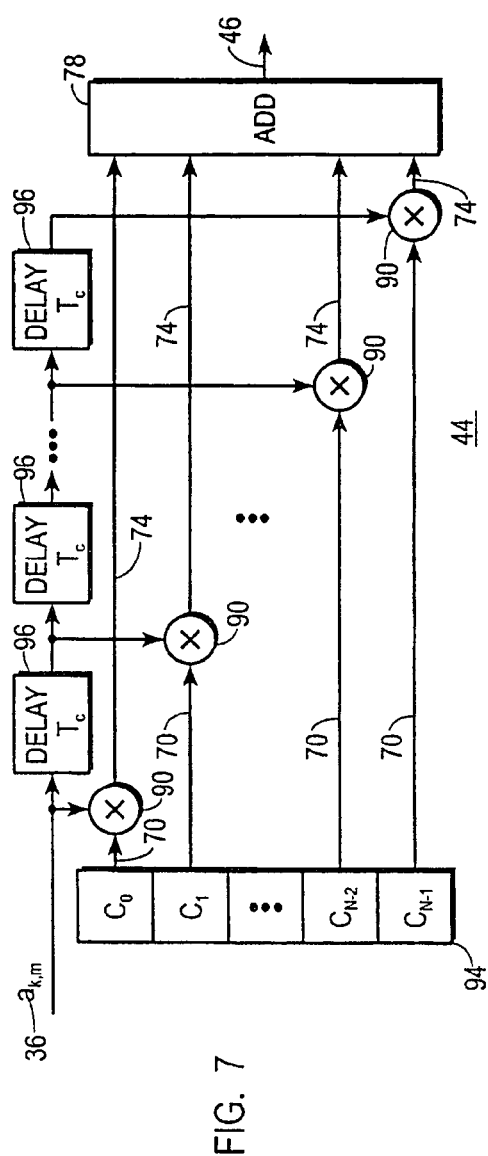
FIG. 7 shows a block diagram of the third embodiment of the DSSS modulation section.

FIG. 7 shows a block diagram of the third embodiment of DSSS modulating section 44. This third embodiment is also equivalent to the first embodiment of FIG. 5, but is implemented differently. This third embodiment is a finite impulse response (FIR) implementation. In this third embodiment, symbol stream 42 (FIG. 3) is fed to a series of delay elements 96, each of which imparts a one-chip interval delay. The series of delay elements 96 serves the role of demultiplexer 68 (FIG. 3) in this third embodiment, with the input to the first delay element 96 and the outputs of all delay elements 96 providing unspread substreams 70. Delay elements 92 (FIGS. 5-6) from the first and second embodiments of spreading section 72 are omitted.

Spreading code generation section 94 simply provides common spreading code 38, and need not be cycled because unspread substreams 70 to which spreading code 38 is applied are configured to perform the temporal offsetting requirements. Accordingly, symbol delay elements 92 are omitted and spreading code generating section 94 need not cycle the common spreading code or explicitly provide separate versions of spreading code 38 to separate unspread substreams 70. Nevertheless, in this third embodiment of DSSS modulation section 44, spreading section 72 temporally offsets application of common spreading code 38 by sequentially delaying symbols 36 to form unspread substreams 70 and applying spreading code 38 to the delayed symbols in unspread substreams 70 so that the resulting spread substreams 74 correspond to unspread substreams 70 modulated by cyclic variations of common spreading code 38.

Figure 8:
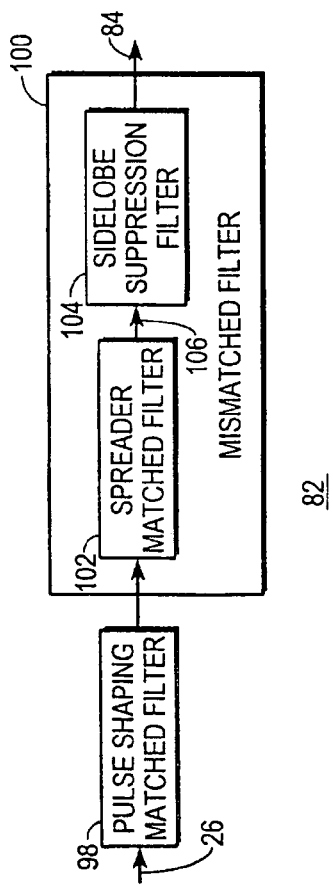
FIG. 8 shows a first embodiment of a CDM to TDM converter section in the receiver of the present invention.

FIG. 8 shows a first embodiment of CDM to TDM converter 82 included in receiver 24 (FIGS. 1 and 3). Desirably, CDM to TDM converter 82 is configured to complement DSSS modulation section 44 of transmitter 22 (FIGS. 1 and 3). In particular, this first embodiment of CDM to TDM converter 82 is configured to complement any of the first through third embodiments of DSSS modulation section 44 discussed above in connection with FIGS. 4-7.

CDM to TDM converter 82 includes a pulse shaping matched filter 98, the output of which feeds a mismatched filter 100. Pulse shaping matched filter 98 complements a pulse shaping filter (not shown) desirably implemented in transmission section 48 of transmitter 22 (FIG. 3) to optimize signal-to-noise ratio and band-limit the signal. Pulse shaping matched filter 98 is desirably implemented using conventional techniques known to those skilled in the art.

Mismatched filter 100 accomplishes two functions. One function is despreading and the other function is sidelobe suppression. In fact, mismatched filter 100 is desirably implemented to correspond to a spreader matched filter 102 upstream of a sidelobe suppression filter 104. One technique for implementing mismatched filter 100 is simply to implement two filters coupled in series for the despreading and sidelobe suppression functions. In another technique (not shown) the two functions may be combined in a common filter.

Mismatched filter 100 experiences a signal-to-noise ratio typically worse than that of a matched filter. However, in the preferred embodiments, mismatched filter 100 is desirably configured to achieve a relative efficiency of greater than 60%, and more preferably greater than 90%, compared to a matched filter.

Those skilled in the art will appreciate that the configuration of common spreading code 38 is a strong determinant of the relative efficiency of mismatched filter 100. For example, conventional orthogonal pseudonoise (PN) codes commonly used in conventional CDMA applications are unacceptable because their mismatched filters achieve relative efficiencies roughly around only 50%.

While a wide variety of different codes may be used with the present invention, codes which have low aperiodic autocorrelation sidelobes and a substantially flat spectral analysis are preferred in this embodiment. Barker codes make suitable codes because of aperiodic autocorrelation sidelobes having magnitudes less than or equal to one. However, for many applications the limited length (i.e., $N \leq 13$) and/or prime numbered length of many Barker codes proves a detriment. In such cases, other codes having a greater length and slightly greater aperiodic autocorrelation sidelobes, such as magnitudes less than or equal to two or three are acceptable and may be easily derived by those skilled in the art.

Figure 9:
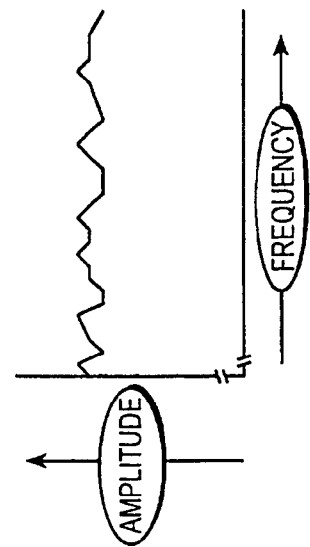
FIG. 9 shows an exemplary spectral analysis of a suitable spreading code usable in connection with the present invention, the spectral analysis showing a substantially flat response.

FIG. 9 shows an exemplary spectral analysis of a suitable spreading code usable in connection with the present invention. In particular, FIG. 9 represents an arbitrary code for which a spectral analysis can be performed using a time-frequency domain transformation, such as a Fourier transform. While a code having a precisely flat spectral analysis result is not a requirement, better results are achieved when no frequency bin shows substantially more or less signal level than other bins, as depicted in FIG. 9. As an example, the signal level in each bin is desirably within ±25% of the average signal level taken over all bins. In particular, for best results no bins should exhibit a nearly zero signal level.

The implementation of mismatched filter 100 illustrated in FIG. 8 will be readily understood by those skilled in the art. Spreader matched filter 102 may be implemented using the complex conjugate of spreading code 38 (FIG. 2) presented in a reverse order. Sidelobe suppression filter 104 may be implemented using well-known FFT or linear programming techniques.

The output of spreader matched filter 102 in mismatched filter 100 is a composite signal 106 equivalent to the autocorrelation function applied to each of the M unspread and spread substreams 70 and 74 (FIGS. 3 and 5-7) discussed above.

Figure 10:
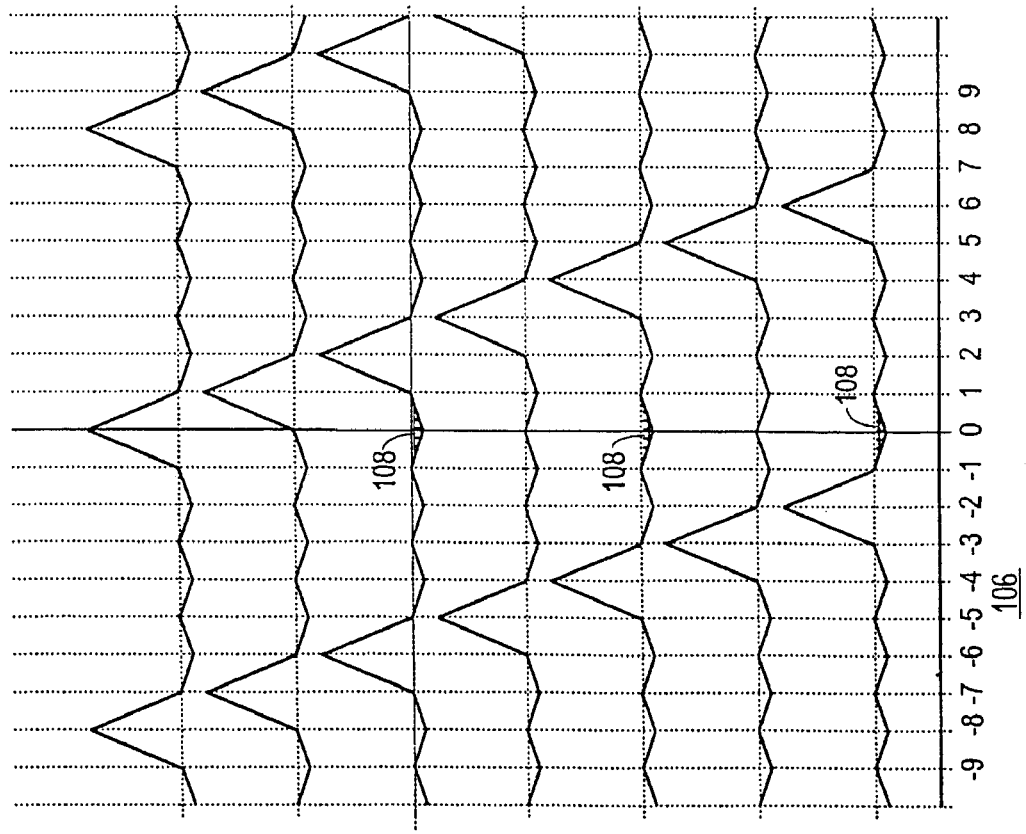
FIG. 10 shows an exemplary timing diagram of various individual signal components present in a composite signal output from a matched filter portion of a mismatched filter in the CDM to TDM converter.

FIG. 10 shows an exemplary timing diagram of the various individual signal components present in composite signal 106 output from the matched filter 102 portion of mismatched filter 100. For convenience, FIG. 10 depicts an exemplary situation where the number of substreams 70 and 74 (i.e., M) equals seven and the number (i.e., N) of chips in spreading code 38 equals seven. Thus, each row in FIG. 10 represents one of the seven substreams, and each row depicts autocorrelation with an assumed rectangular pulse. Of course, composite signal 106 is the sum of all rows in FIG. 10 rather than seven distinct signals.

Assuming ideal synchronization where samples are taken at the integral chip intervals of 0, 1, 2, ..., then in this example, seven successive samples yield the signal levels of the seven substreams. However, each sample in composite signal 106 is corrupted by self-interference 108, caused by sidelobes of the autocorrelation function. Accordingly, sidelobe suppression filter 104 (FIG. 8) substantially attenuates the self-interference 108 of the sidelobes while not severely attenuating the autocorrelation peak.

Referring back to FIGS. 3 and 8, the output sidelobe suppression filter 104 provides baseband signal 84, which also serves as the output of CDM to TDM converter 82. Baseband signal 84 is routed to TDM demodulation section 86. Depending upon the severity of multipath remaining in baseband signal 84 after processing through sidelobe suppression filter 104, a rake receiver (not shown) or equalizer (not shown) may be used in TDM demodulation section 86 to compensate for the multipath. While some inefficiency may result from using a mismatched filter to despread communication signal 26, any such inefficiency is more than compensated for by a marked improvement in multipath tolerance.

While receiver 24 receives a communication signal 26 from one transmitter 22, it may simultaneously receive other communication signals 26 from other transmitters 22 in adjacent radio coverage areas 28 (FIG. 1). Conventional CDMA techniques may be used to prevent interference between such diverse communication signals 26. For example, different spreading codes 38 may be selected for use at different transmitters 22. Such different spreading codes 38 are desirably configured to have low cross-correlation sidelobes among all spreading codes 38. If this option is selected, only a few (e.g., 3-7) of such codes need be used to prevent interference because interference should not be a problem between communication signals 26 from non-adjacent radio coverage areas 28 (FIG. 1). Alternatively, transmitter 22 and receiver 24 may include other stages to further scramble/descramble spread spectrum signals using other spreading codes.

The embodiments of the present invention discussed above and characterized by the timing depicted in FIG. 4, wherein composite signal 46 is influenced, at least for a portion of the time, by symbols 36 from two different blocks 34, show advantageous resilience in the presence of multipath. However, alternate embodiments, discussed below, may provide even better performance in the presence of multipath for some applications.

Figure 11:
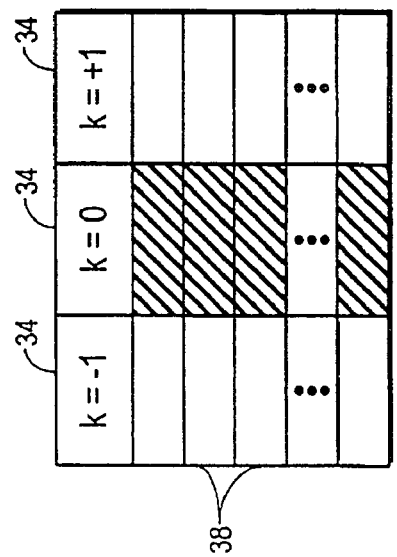
FIG. 11 shows a timing diagram depicting how a cyclic spreading code is applied to blocks of unspread data streams in fourth and fifth embodiments of the DSSS modulation section.

FIG. 1 shows a timing diagram depicting how common spreading code 38 (FIG. 2) is applied to blocks 34 (FIG. 2) of unspread data substreams 70 (FIG. 3) in accordance with fourth and fifth embodiments of DSSS modulation section 44 (FIG. 3) in transmitter 22 (FIG. 3). Like FIG. 4 discussed above, FIG. 11 is presented in tabular form, with rows representing the application of the chips of common spreading code 38 to symbols 36 (FIG. 2). Columns in FIG. 11 depict successive blocks 34. As indicated by a shaded region in FIG. 11, spreading code 38 in the fourth and fifth embodiments is applied to unspread substreams 70 so that composite signal 46 is influenced, at all times, by symbols 36 from only common blocks 34.

Figure 12:
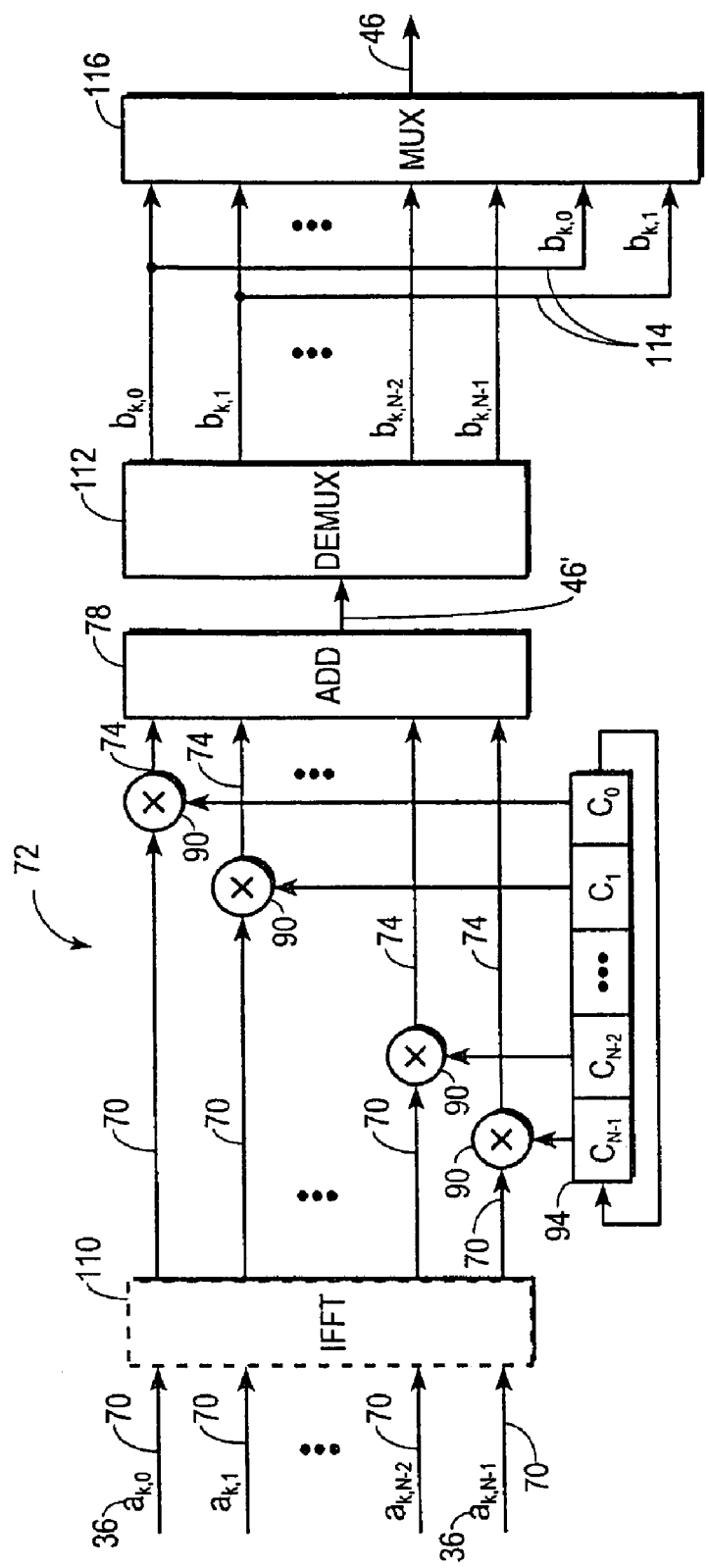
FIG. 12 shows a block diagram of the fourth and fifth embodiments of the DSSS modulation section.

FIG. 12 shows a block diagram of the fourth and fifth embodiments of DSSS modulation section 44. Demultiplexer 68 (FIG. 3) is omitted from FIG. 12 for convenience. In addition, in order to enable matrix multiplication operations discussed below, FIG. 12 represents that N symbols 36 (i.e. $a_{k,0}$ through $a_{k,N-1}$) are provided from demultiplexer 68 during each block 34 (FIG. 2). In other words, FIG. 12 represents that the number (M) of symbols 36 per block 34 equals the number (N) of chips in spreading code 38. Those skilled in the art will appreciate that when M<N, the number M of symbols 36 per block 34 may be made equal to N by padding with zeros so that the zeros are evenly distributed among the symbols 36. As an example, if M equals 4 and N equals 12, then 12 symbols 36 may be provided by following each symbol 36 in each block 34 with two zeros.

Unspread substreams 70, which provide N symbols 36 per block 34, pass to an optional time-frequency domain transformation section 110. Time-frequency domain transformation section 110 may be implemented as an inverse fast Fourier transform (IFFT). For purposes of the present discussion, the fourth embodiment of DSSS modulation section 44 shall be deemed to omit section 110, while the fifth embodiment shall be deemed to include section 110. Thus, unspread substreams 70 convey time domain data to spreading section 72 in the fourth embodiment and frequency domain data to spreading section 72 in the fifth embodiment.

While section 110 is not a requirement of the present invention, certain benefits may be achieved by the addition of section 110 as will be discussed below. Moreover, section 110, or the equivalent, is conventionally included in digital communication transmitters which implement an orthogonal frequency division multiplexed (OFDM) modulation format. In such situations, section 110 may be present for use in connection with the present invention at little additional complexity or expense.

Delay elements 92 (FIGS. 5-6) are omitted in the fourth and fifth embodiments of DSSS modulation section 44 to permit only symbols 36 concurrently present during a common block 34 to influence composite signal 46. However, spreading section 72 and spreading code generating section 94 are implemented in a manner similar to that discussed above in connection with the first and second embodiments of DSSS modulation section 44 (FIGS. 5-6). In particular, cyclic variations of a single common spreading code 38 are applied in the form of a cyclic Toeplitz matrix (see FIG. 5). While spreading code generating section 94 acts to multiply the 1×N matrix of symbols 36 in each block 34 by spreading code 38 effectively in the form of an N×N cyclic Toeplitz matrix, it may do so simply through a one-dimensional matrix having different columns applied to different unspread substreams 70 at different multipliers 90. Instead of selecting a spreading code 38 with low aperiodic autocorrelation sidelobes as discussed above in connection with the first, second and third embodiments of DSSS modulation section 44, the fourth and fifth embodiments of DSSS modulation section 44 are better served with a spreading code 38 having low periodic autocorrelation sidelobes and a substantially flat spectrum. Spreading code generation section 94 may be implemented as a shift register configured to shift cyclically at the chip rate. Spread substreams 74 output from multipliers 90 are combined in an adding circuit 78 to form a pre-composite signal 46', which is converted back into parallel streams at a demultiplexer (DEMUX) 112 into N chips per block 34, labeled $b_{k,0}$ through $b_{k,N-1}$ in FIG. 12.

Demultiplexer 112 provides one technique for forming a cyclic prefix 114. Chips $b_{k,0}$ through $b_{k,N-1}$ and cyclic prefix 114 are routed in parallel to inputs of a multiplexer (MUX) 114 for conversion into serial composite signal 46. In particular, chips $b_{k,0}$ through $b_{k,N-1}$ are associated with an intended order, in which chips $b_{k,0}, b_{k,1}, b_{k,2}, \ldots b_{k,P}$ occur first in pre-composite signal 46', and chips $b_{k,q}, \ldots b_{k,N-3}, b_{k,N-2}, b_{k,N-1}$, occur last in pre-composite signal 46'. FIG. 12 illustrates an example where the p=2 first-occurring spread substreams in pre-composite signal 46' are repeated as cyclic prefix 114 so that they also occur last in composite signal 46. Of course, those skilled in the art will appreciate that the clock rate of multiplexer 116 is desirably sufficiently higher than the clock chip rate to accommodate cyclic prefix 114.

Transmission section 48 forms blocks 34 of communication signal 26 from blocks 34 of composite signal 46. Blocks 34 of communication signal 26 propagate to receiver 24 through a communication channel, which may be unique to a specific transmitter 22 location and receiver 24 location. Blocks 34 of communication signal 26 experience multipath and other types of distortion when propagating through this channel. The mathematical effect of this distortion is equivalent to multiplying composite signal 46 by the transfer function of the channel, which imposes the multipath.

As discussed above, each block 34 of composite signal 46 is formed from the matrix multiplication of the spreading code 38 with a block 34 of symbols 36. The effect of multipath distortion is then the matrix multiplication of the matrix expression of the channel transfer function with this matrix product. Normally, a matrix multiplication does not observe a communicative mathematical property. In other words, the product of the channel transfer function by the spreading matrix does not necessarily equal the product of spreading matrix by the channel transfer function.

Due to the failure of the mathematical communicative property in matrix multiplication, normally equalization to compensate for multipath should be performed before despreading in receiver 22. Unfortunately, such equalization is exceedingly difficult to successfully perform, due at least in part to requiring the implementation of a filter with characteristics equivalent to the inverse of the channel transfer function. The characteristics of the channel cannot be easily controlled, and channel transfer function quite possibly has elements near zero. Attempting to form inverse filters of such characteristics often leads to unstable implementations.

However, the use of cyclic variations of common spreading code 38, when combined with cyclic prefix 114 and processed as discussed below in receiver 24, enables the mathematical communicative property. Consequently, despreading may now occur prior to equalization for multipath, thereby making effective equalization a relatively simple task.

Figure 13:
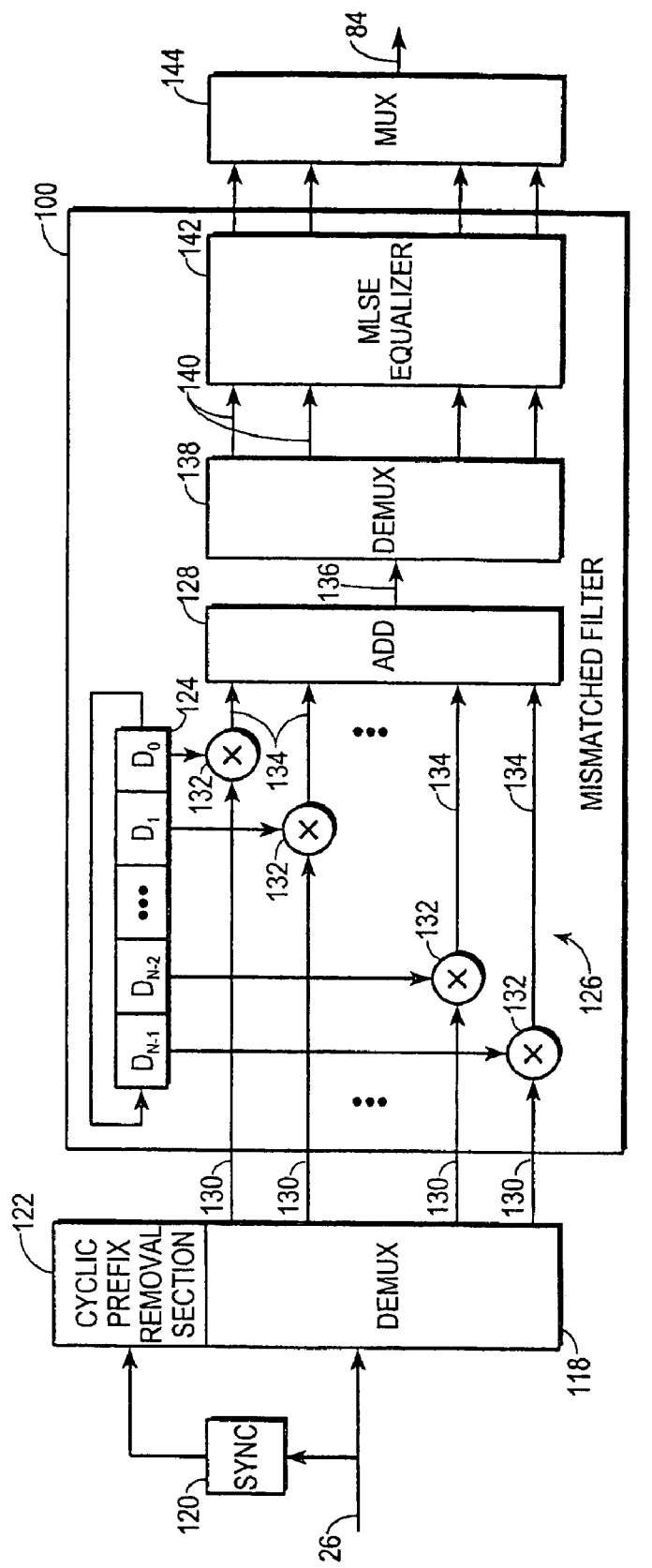
FIG. 13 shows a second embodiment of the CDM to TDM converter for use with the fourth embodiment of the DSSS modulation section.

FIG. 13 shows a second embodiment of CDM to TDM converter 82 for use with the fourth embodiment of the DSSS modulation section 44 (i.e., the time domain embodiment). The digitized IF form of communication signal 26, after being distorted through the communication channel, is applied to a demultiplexer (DEMUX) 118 and a synchronization (SYNC) section 120. An output of synchronization section 120 feeds a cyclic prefix removal section 122 of demultiplexer 118. Synchronization section 120 identifies the start of blocks 34, and cyclic prefix removal section 122 removes the first-occurring p chips from each block 34. As discussed above, the last-occurring p chips duplicate the first-occurring p chips, and the last-occurring p chips and all other chips remain in each block 34. The first-occurring p chips are removed because they are influenced by multipath from the previous block 34 of communication signal 26. All chips, which remain in each block 34, are influenced only by multipath from that block 34.

The block 34 of chips, with cyclic prefix 114 (FIG. 12) removed, passes to mismatched filter 100 for despreading and equalization. As discussed above, due to the use of cyclic variations of spreading code 38 to spread symbols 36 and the inclusion of cyclic prefix 114, the matrix multiplication which characterizes the channel now observes the communicative mathematical property. Consequently, despreading may occur before equalization.

Despreading may take place using a despreading code generator 124, a despreading section 126, and a combining section 128. Despreading code generator 124, despreading section 126, and combining section 128 are identical in structure to spreading code generator 94, spreading section 72, and combining section 78 in DSSS modulator section 44 of transmitter 22 (FIG. 12), with the despreading code generated in despreading code generator 124 being related to spreading code 38. In particular, despreading code chips $D_n$=IFFT(1/FFT($C_n$)), where IFFT and FFT denote inverse fast Fourier transform and fast Fourier transform, respectively, and $C_n$ represents the chips of spreading code 38.

Spread substreams 130 are provided by demultiplexer 118 to multipliers 132 in despreading section 126 along with the despreading code matrix from despreading code generator 124. The despreading code is applied in the form of a cyclic Toeplitz matrix due to the use of cyclic variations of a common spreading code to which the despreading code is related. Multipliers 132 provide despread substreams 134 to combiner 128 to add despread substreams 134 on a chip by chip basis into a serial pre-composite baseband signal 136. Pre-composite baseband signal 136 is converted into parallel symbol substreams 140 at a demultiplexer (DEMUX) 138, and symbol substreams 140 are applied to a maximum likelihood sequence estimation (MLSE) equalizer 142 or the equivalent. MLSE equalizer 142 may also be called a Viterbi equalizer. Parallel outputs from MLSE equalizer 142 feed a multiplexer (MUX) 144 which converts the parallel symbol substreams into baseband signal 84 for further processing by TDM demodulation section 86 (FIG. 3).

Those skilled in the art will appreciate that an MLSE equalizer is a simple structure, which is stable and can be effectively configured to compensate for multipath. The coupling of MLSE equalizer 142 downstream of despreading section 126 is possible due to the use of cyclic variations of common spreading code 38 in transmitter 22 and cyclic prefix 114 to enable matrix multiplication exhibiting the mathematical communicative property.

Figure 14:
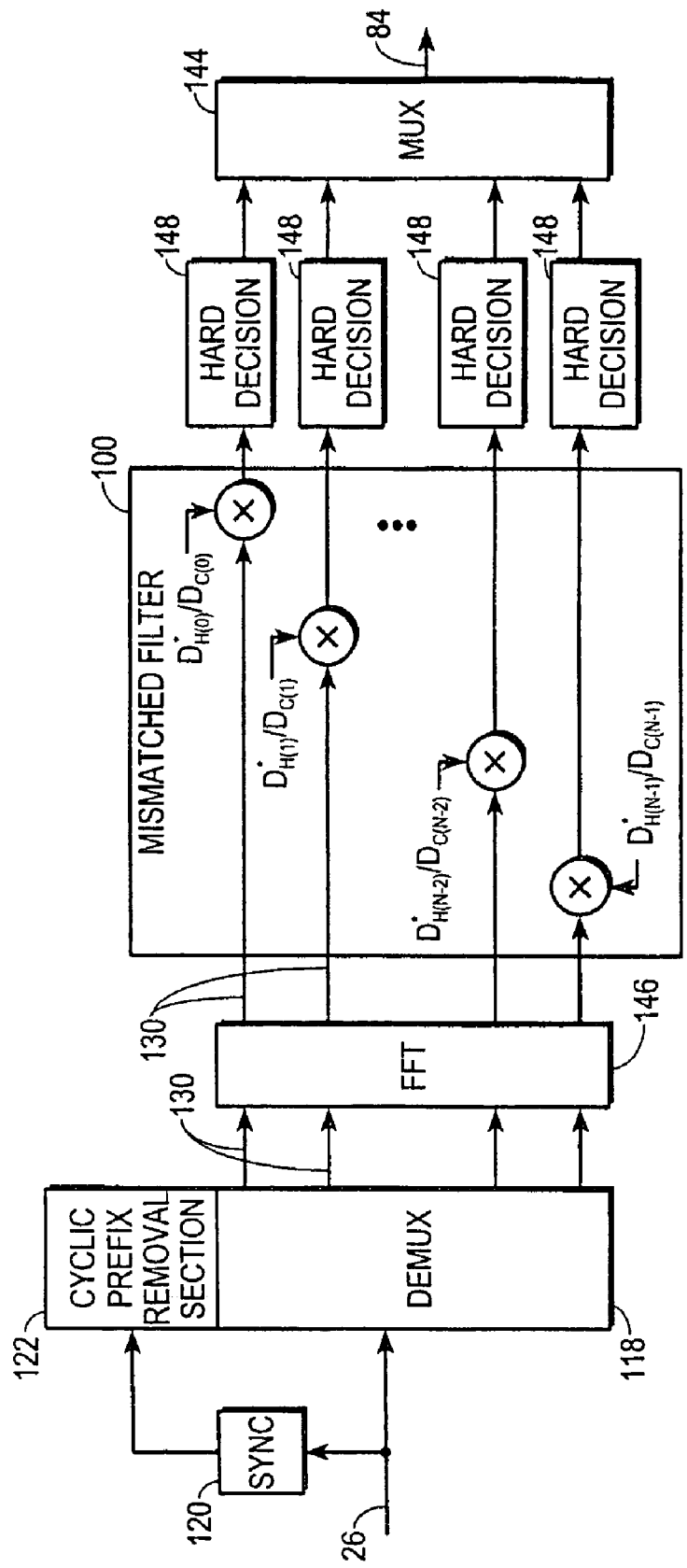
FIG. 14 shows a third embodiment of the CDM to TDM converter for use with the fifth embodiment of the DSSS modulation section.

FIG. 14 shows a third embodiment of CDM to TDM converter 82 for use with the fifth embodiment of DSSS modulation section 44 (i.e., the frequency domain embodiment), discussed above in connection with FIG. 12. The digitized IF form of communication signal 26, after being distorted through the communication channel, is applied to demultiplexer (DEMUX) 118 and synchronization (SYNC) section 120, as discussed above in connection with FIG. 13. Likewise, cyclic prefix 114 (FIG. 12) is removed at cyclic prefix removal section 122 of demultiplexer 118, as discussed above in connection with FIG. 13.

Spread substreams 130 are provided by demultiplexer 118 to a time-frequency domain transformation section 146, which complements time-frequency domain transformation section 110 (FIG. 12). Thus, if time-frequency domain transformation section 110 in DSSS modulation section 44 implements an inverse fast Fourier transform (IFFT), then time-frequency domain transformation section 146 desirably implements a fast Fourier transform (FFT).

Mismatched filter 100 couples downstream of time-frequency domain transformation section 146. In this third embodiment of CDM to TDM converter 82 mismatched filter 100 may be implemented in a manner that joins despreading and equalization functions in a common frequency domain equalizer. As illustrated in FIG. 14, coefficients for the frequency domain equalizer take the form $D^*_{H(n)}/D_{C(n)}$, where represents despreading code chips that are related to spreading code 38 in the manner discussed above in connection with FIG. 13 and $D^*_{H(n)}$ represents the complex conjugate of the transfer function of the channel. One reason why a frequency domain equalizer is easy and effective to implement is that coefficients are not proportional to the inverse of the transfer function of the channel. While despreading code chips are related to the inverse of the FFT of the spreading code, such coefficients do not pose problems because the designer controls the FFT of the code through code selection, and a spreading code having a substantially flat spectral response may be selected, as discussed above in connection with FIG. 9.

Parallel outputs of mismatched filter 100 pass in parallel to hard decision sections 148, and parallel outputs of hard decision sections 148 are combined into serial baseband signal 84 in multiplexer (MUX) 144 for further processing in TDM demodulation section 86 (FIG. 3).

Due to the enabling of the mathematical communicative property for matrix multiplication discussed above, mismatched filter 100 may reside downstream of time-frequency transformation section 146, which improves the efficacy and simplicity of the equalization and despreading functions.

The present invention provides an improved method and apparatus for wireless communications. The present invention contemplates the combination of TDMA and spread spectrum techniques so that wireless communications capacity is increased over the capacities achievable through conventional TDMA and/or CDMA systems using an equivalent amount of spectrum. Furthermore, robust, simple, and inexpensive processing techniques are usable in the present invention, making the present invention suitable for hubs, subscriber units, mobile stations, fixed stations, portable stations, and the like. The present invention may be adapted to and used in conjunction with a variety of modulation and multiple access techniques, such as frequency division multiple access (FDMA) and orthogonal frequency division multiplexing (OFDM). The advantages and improvements of the present invention are achieved, at least in part through the use of a composite RF communication signal which includes signal components obtained by modulating diverse branches of a single user's data stream using cyclic variants of a common spreading code. The present invention is configured to tolerate self-interference and is better able to tolerate multipath than conventional DSSS-CDMA communication systems.

Figure 15:
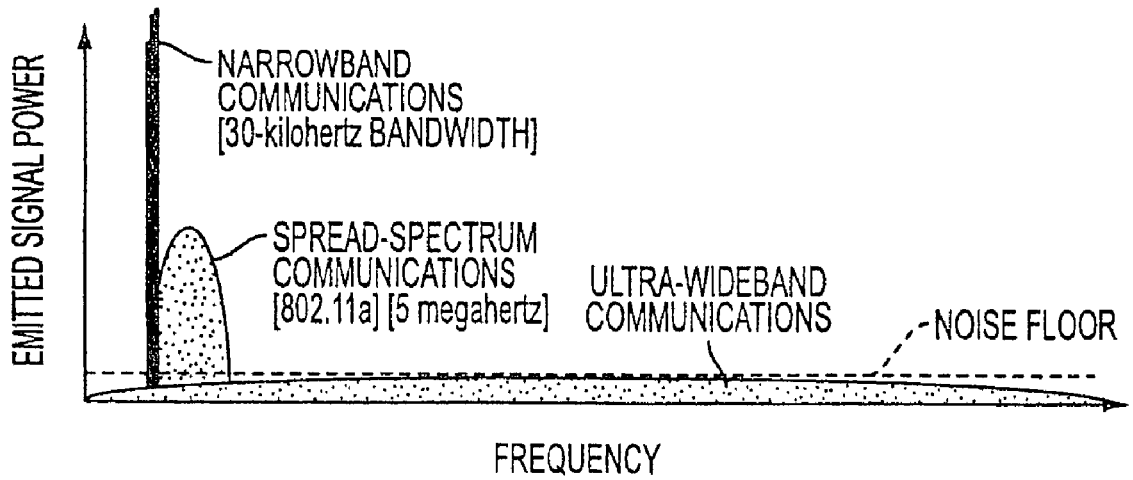
FIG. 15 is an illustration of different communication methods.
Figure 16:
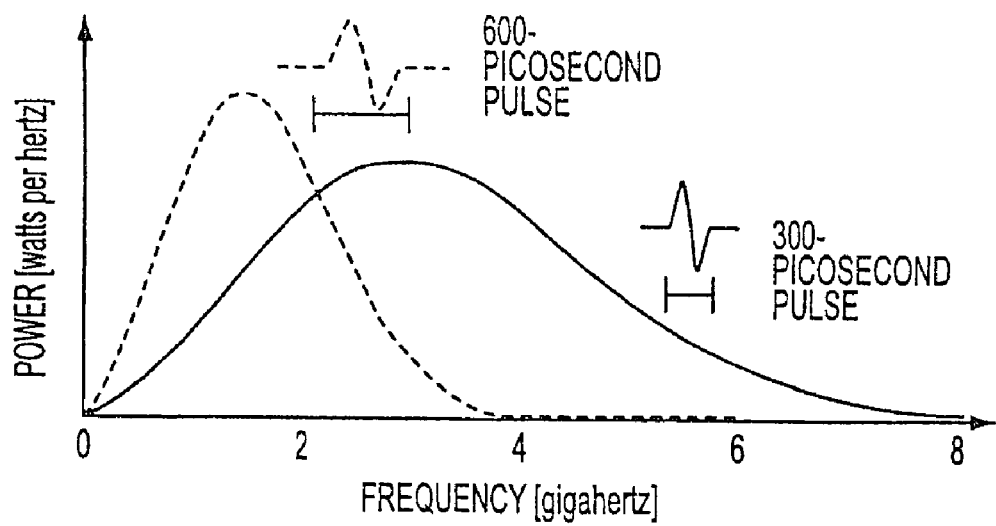
FIG. 16 is an illustration of two ultra-wideband pulses.

With reference to FIGS. 15 and 16, additional embodiments of the present invention will now be described. The embodiments described below employ ultra-wideband communication technology. Referring to FIGS. 15 and 16, ultra-wideband (UWB) communication technology employs discrete pulses of electromagnetic energy that are emitted at, for example, nanosecond or picosecond intervals (generally tens of picoseconds to hundreds of nanoseconds in duration). For this reason, ultra-wideband is often called "impulse radio." That is, the UWB pulses may be transmitted without modulation onto a sine wave, or a sinusoidal carrier, in contrast with conventional carrier wave communication technology. Thus, UWB generally requires neither an assigned frequency nor a power amplifier.

Another example of sinusoidal carrier wave communication technology is illustrated in FIG. 15. IEEE 802.11a is a wireless local area network (LAN) protocol, which transmits a sinusoidal radio frequency signal at a 5 GHz center frequency, with a radio frequency spread of about 5 MHz. As defined herein, a carrier wave is an electromagnetic wave of a specified frequency and amplitude that is emitted by a radio transmitter in order to carry information. The 802.11 protocol is an example of a carrier wave communication technology. The carrier wave comprises a substantially continuous sinusoidal waveform having a specific narrow radio frequency (5 MHz) that has a duration that may range from seconds to minutes.

In contrast, an ultra-wideband (UWB) pulse may have a 2.0 GHz center frequency, with a frequency spread of approximately 4 GHz, as shown in FIG. 16, which illustrates two typical UWB pulses. FIG. 16 illustrates that the shorter the UWB pulse in time, the broader the spread of its frequency spectrum. This is because bandwidth is inversely proportional to the time duration of the pulse. A 600-picosecond UWB pulse can have about a 1.8 GHz center frequency, with a frequency spread of approximately 1.6 GHz and a 300-picosecond UWB pulse can have about a 3 GHz center frequency, with a frequency spread of approximately 3.2 GHz. Thus, UWB pulses generally do not operate within a specific frequency, as shown in FIG. 15. In addition, either of the pulses shown in FIG. 16 may be frequency shifted, for example, by using heterodyning, to have essentially the same bandwidth but centered at any desired frequency. And because UWB pulses are spread across an extremely wide frequency range, UWB communication systems allow communications at very high data rates, such as 100 megabits per second or greater.

Also, because the UWB pulses are spread across an extremely wide frequency range, the power sampled in, for example, a one megahertz bandwidth, is very low. For example, UWB pulses of one nano-second duration and one milliwatt average power (0 dBm) spreads the power over the entire one gigahertz frequency band occupied by the pulse. The resulting power density is thus 1 milliwatt divided by the 1,000 MHz pulse bandwidth, or 0.001 milliwatt per megahertz (−30 dBm/MHz).

Generally, in the case of wireless communications, a multiplicity of UWB pulses may be transmitted at relatively low power density (milliwatts per megahertz). However, an alternative UWB communication system may transmit at a higher power density. For example, UWB pulses may be transmitted between 30 dBm to −50 dBm.

Several different methods of ultra-wideband (UWB) communications have been proposed. For wireless UWB communications in the United States, all of these methods must meet the constraints recently established by the Federal Communications Commission (FCC) in their Report and Order issued Apr. 22, 2002 (ET Docket 98-153). Currently, the FCC is allowing limited UWVB communications, but as UWB systems are deployed, and additional experience with this new technology is gained, the FCC may expand the use of UWB communication technology. It will be appreciated that the present invention may be applied to current forms of UWB communications, as well as to future variations and/or varieties of UWB communication technology.

For example, the April 22 Report and Order requires that UWB pulses, or signals occupy greater than 20% fractional bandwidth or 500 megahertz, whichever is smaller. Fractional bandwidth is defined as 2 times the difference between the high and low 10 dB cutoff frequencies divided by the sum of the high and low 10 dB cutoff frequencies. However, these requirements for wireless UWB communications in the United States may change in the future.

Communication standards committees associated with the International Institute of Electrical and Electronics Engineers (IEEE) are considering a number of ultra-wideband (UWB) wireless communication methods that meet the current constraints established by the FCC. One UWB communication method may transmit UWB pulses that occupy 500 MHz bands within the 7.5 GHz FCC allocation (from 3.1 GHz to 10.6 GHz). In one embodiment of this communication method, UWB pulses have about a 2-nanosecond duration, which corresponds to about a 500 MHz bandwidth. The center frequency of the UWB pulses can be varied to place them wherever desired within the 7.5 GHz allocation. In another embodiment of this communication method, an Inverse Fast Fourier Transform (IFFT) is performed on parallel data to produce 122 carriers, each approximately 4.125 MHz wide. In this embodiment, also known as Orthogonal Frequency Division Multiplexing (OFDM), the resultant UWB pulse, or signal is approximately 506 MHz wide, and has a 242 nanosecond duration. It meets the FCC rules for UWB communications because it is an aggregation of many relatively narrow band carriers rather than because of the duration of each pulse.

Another UWB communication method being evaluated by the IEEE standards committees comprises transmitting discrete UWB pulses that occupy greater than 500 MHz of frequency spectrum. For example, in one embodiment of this communication method, UWB pulse durations may vary from 2 nanoseconds, which occupies about 500 MHz, to about 133 picoseconds, which occupies about 7.5 GHz of bandwidth. That is, a single UWB pulse may occupy substantially all of the entire allocation for communications (from 3.1 GHz to 10.6 GHz).

Yet another UWB communication method being evaluated by the IEEE standards committees comprises transmitting a sequence of pulses that may be approximately 0.7 nanoseconds or less in duration, and at a chipping rate of approximately 1.4 giga pulses per second. The pulses are modulated using a Direct-Sequence modulation technique, and is called DS-UWB. Operation in two bands is contemplated, with one band is centered near 4 GHz with a 1.4 GHz wide signal, while the second band is centered near 8 GHz, with a 2.8 GHz wide UWB signal. Operation may occur at either or both of the UWB bands. Data rates between about 28 Megabits/second to as much as 1,320 Megabits/second are contemplated.

Thus, described above are three different methods of wireless ultra-wideband (UWB) communication. It will be appreciated that the present invention may be employed using any one of the above-described methods, variants of the above methods, or other UWB communication methods yet to be developed.

Certain features of the present invention may be employed by an ultra-wideband (CUB) communication system. For example, one embodiment of an UWB communication system divides a stream of data conveying symbols into a plurality of unspread substreams. A common spreading code is generated at the ultra-wideband transmitter, and each of the unspread substreams are spread using the common spreading code to form a plurality of spread substreams. The spread substreams are combined to form a composite signal that is transmitted using a plurality of discrete electromagnetic pulses.

In another embodiment, an ultra-wideband communication system comprises a demultiplexer for dividing a stream of data conveying symbols into a plurality of unspread substreams. A spreading section is coupled to the demultiplexer and configured to generate a plurality of spread substreams from the plurality of unspread substreams. A combining section is coupled to the spreading section and configured to form a composite signal from the plurality of spread substreams, and a transmission section is coupled to the combining section and configured to transmit the composite signal over an ultra-wideband communication channel.

The UWB devices, systems and/or methods in the above-described embodiments communicate with each other by transmitting and receiving a plurality of discrete electromagnetic pulses, as opposed to a substantially continuous carrier wave. Each pulse may have a duration that can range between about 10 picoseconds to about 1 microsecond, and a power that may range between about +30 dBm to about −60 dBm, as measured at a single frequency.

The present invention may be employed in any type of network, be it wireless, wire, or a mix of wire media and wireless components. That is, a network may use both wire media, such as coaxial cable, and wireless devices, such as satellites, or cellular antennas. As defined herein, a network is a group of points or nodes connected by communication paths. The communication paths may use wires or they may be wireless. A network as defined herein can interconnect with other networks and contain sub-networks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology used by the network, such as, for example, a Transmission Control Protocol/Internet Protocol (TCP/IP) network, a Systems Network Architecture network, among others. A network as defined herein can also be characterized by whether it carries voice, data, or both kinds of signals. A network as defined herein may also be characterized by users of the network, such as, for example, users of a public switched telephone network (PSTN) or other type of public network, and private networks (such as within a single room or home), among others. A network as defined herein can also be characterized by the usual nature of its connections, for example, a dial-up network, a switched network, a dedicated network, and a non-switched network, among others. A network as defined herein can also be characterized by the types of physical links that it employs, for example, optical fiber, coaxial cable, a mix of both, unshielded twisted pair, and shielded twisted pair, among others.

The present invention may be employed in any type of wireless network, such as a wireless PAN, LAN, MAN, or WAN. In addition, the present invention may be employed in wire media, as the present invention dramatically increases the bandwidth of conventional networks that employ wire media, such as hybrid fiber-coax cable networks, or CATV networks, yet it can be inexpensively deployed without extensive modification to the existing wire media network.

Thus, it is seen that systems and methods of ultra-wideband communications are provided. One skilled in the art will appreciate that the present invention can be practiced by other than the above-described embodiments, which are presented in this description for purposes of illustration and not of limitation. For example, those skilled in the art will appreciate that the order of time-frequency domain transformation and spreading functions may be reversed from that shown in FIG. 12. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. An ultra-wideband communication system comprising:
   a plurality of transmitters configured to wirelessly transmit Time Division Multiple Access (TDMA) ultra-wideband composite signals which convey messages in adjacent radio coverage areas in accordance with a frequency reuse pattern substantially equal to one;
   a plurality of ultra-wideband receivers located in the adjacent radio coverage areas wherein each receiver is configured to detect one of the messages intended for the each ultra-wideband receiver by identifying time slots assigned to each receiver;
   wherein each of the ultra-wideband transmitters comprises:
   a demultiplexer for dividing a TDMA stream of data-conveying symbols into a plurality of unspread substreams;
   a spreading section coupled to the demultiplexer and configured to generate spread substreams from the plurality of unspread substreams, the spreading section being configured so that the spread substreams correspond to respective ones of the unspread substreams modulated by cyclic variations of a common spreading code;
   a combining section coupled to the spreading section and configured to form a composite signal in response to the spread substreams;
   a transmission section coupled to the combining section and configured to transmit one of the TDMA ultra-wideband composite signals; and
   wherein each of the ultra-wideband receivers comprises:
   a receiving section configured to receive one of the TDMA ultra-wideband composite signals; and
   a despreading section coupled to the receiving section, the despreading section being configured to generate a baseband signal in response to the TDMA ultra-wideband composite signal.

2. The system of claim 1, wherein each of the TDMA ultra-wideband composite signals comprises a plurality of discrete electromagnetic pulses, with each pulse having a duration that can range between about 10 picoseconds to about 1 microsecond.

3. The system of claim 2, wherein each discrete electromagnetic pulse has a power that can range between about +30 dBm to about −60 dBm, as measured at a single frequency.

* * * * *